United States Patent [19]

Shiratori et al.

[11] Patent Number: 5,017,060
[45] Date of Patent: May 21, 1991

[54] ROTARY CUTTING TOOL

[75] Inventors: Hidehisa Shiratori; Kazuo Iizuka, both of Tokyo, Japan

[73] Assignee: Mitsubishi Metal Corporation, Tokyo, Japan

[21] Appl. No.: 508,818

[22] Filed: Apr. 16, 1990

[51] Int. Cl.$^5$ .............................................. B27G 3/00
[52] U.S. Cl. ........................................ 409/137; 407/34; 407/120; 407/1; 407/2
[58] Field of Search ..................... 409/134, 137 X; 407/120, 1, 2, 3, 34, 35, 53, 54

[56] References Cited

U.S. PATENT DOCUMENTS

| | | | |
|---|---|---|---|
| 2,944,465 | 7/1960 | Jones | 409/137 |
| 3,167,260 | 1/1965 | Gibbons | 409/137 |
| 3,837,383 | 9/1974 | Ko | 409/137 |
| 4,563,115 | 1/1986 | Abe et al. | 409/137 |
| 4,742,855 | 5/1988 | Horttey | 409/137 |
| 4,909,293 | 3/1990 | Msioki | 409/137 |

FOREIGN PATENT DOCUMENTS 1109014 4/1989 Japan .

Primary Examiner—Frederick R. Schmidt
Assistant Examiner—Blynn Shideler
Attorney, Agent, or Firm—Cushman, Darby & Cushman

[57] ABSTRACT

There is disclosed a rotary cutting tool having a cutter body and at least one pair of end and peripheral cutting edges provided on the cutter body. A covering of a generally cylindrical shape is disposed rotatably relative to the cutter body so as to surround the circumferential surface of a forward end portion of the cutter body to define a chip disposal space therebetween. A guide member is secured to the forward end portion of the cutter body for guiding chips produced during a cutting operation to the chip disposal space. Furthermore, a chip disposal pipe is connected to the covering for removing the chips in the chip disposal space.

5 Claims, 3 Drawing Sheets

ROTARY CUTTING TOOL

BACKGROUND OF THE INVENTION

1. Field of the Invention

The present invention relates to a rotary cutting tool, such as a face milling cutter, which is mainly employed to carry out surface cutting.

2. Prior Art

FIGS. 1 to 3 depict one conventional face milling cutter which includes a cutter body 1 having a reduced diameter portion at one of its ends. A plurality of insert receiving recesses 2, each of which is opened radially outwardly and forwardly with respect to the cutter body 1, are formed in the cutter body 1 at its forward end in a circumferentially equally spaced relation to one another. An indexable cutter insert 3 is received by and releasably secured to each insert receiving recess 2 by means of a wedge member 4 and a clamp screw 5.

For carrying out a surface cutting using the aforesaid face milling cutter, chips produced by cutting edges 3a and 3b of each insert 3 are broken by a respective chip pocket 7 and are removed away from the cutter body 1. In conjunction with this, the conventional cutter has the following disadvantages:

The chips removed from a workpiece W are caused to scatter randomly on the surface of the workpiece W or the machine tool, or around the machine tool. Hence, the environmental conditions for the cutting operation are worsened, and the chips scattered around engage between sliding surfaces of the machine tool, causing the accuracy and service life of the machine tool to deteriorate.

In addition, when the chips pile up on the surface of the workpiece W, they become jammed at the cutting edges, resulting in the fracturing of the cutting edges or deterioration of the worked surface of the workpiece.

Furthermore, inasmuch as the chips are usually heated to a high temperature, those chips which are piled up on the surface of the workpiece W and on the machine tool come to act as heat-generating sources and cause the workpiece W or the machine tool to be subjected to thermal deformation, resulting in the lowering of working precision.

SUMMARY OF THE INVENTION

It is therefore an object of the present invention to provide a rotary cutting tool which can cut a workpiece without causing chips to scatter on the surface of the workpiece or around the machine tool.

According to the present invention, there is provided a rotary cutting tool comprising a cutter body including an axis of rotation therethrough and including a forward end portion having an outer circumferential surface and a forward end face; cutting means provided on the cutter body and having at least one end cutting edge disposed in an end cutting position and at least one outer peripheral cutting edge disposed in an outer peripheral cutting position; a covering of a generally cylindrical shape disposed rotatably relative to the cutter body so as to surround the outer circumferential surface of the forward end portion of the cutter body to define a chip disposal space therebetween; a guide member attached to the forward end portion of the cutter body for leading chips produced during the cutting operation to the chip 1 space; and suction means connected to the covering for removing the chips in the chip disposal space outwardly.

DESCRIPTION OF THE PREFERRED EMBODIMENTS OF THE INVENTION

Figure 1:
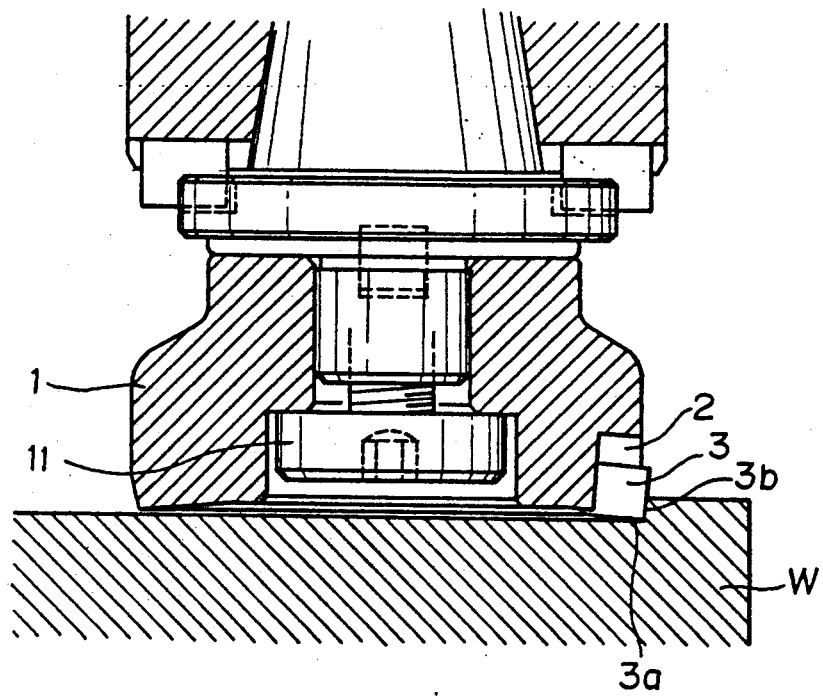
FIG. 1 is a cross-sectional view of a conventional face milling cutter.
Figure 2:
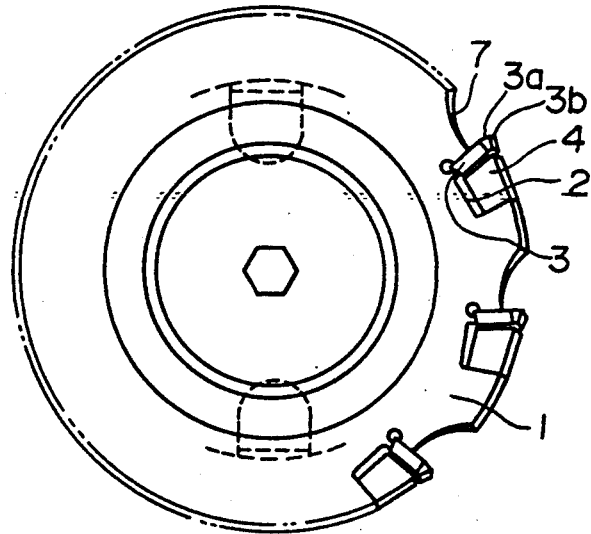
FIG. 2 is an end view of the face milling cutter of FIG. 1.
Figure 3:
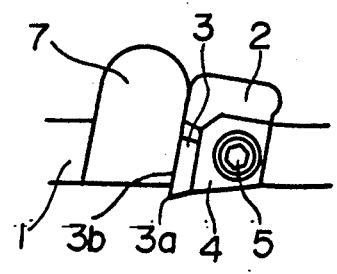
FIG. 3 is a side elevation of a part of the milling cutter of FIG. 1.
Figure 4:
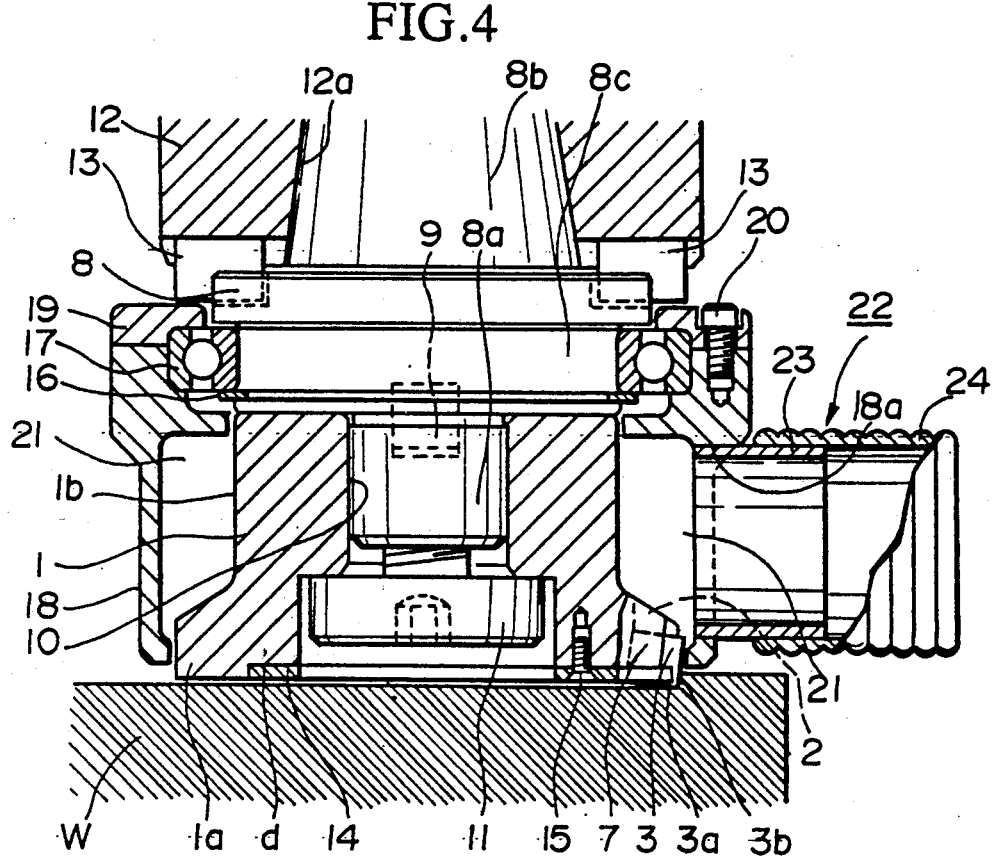
FIG. 4 is a view similar to FIG. 1, but showing a face milling cutter in accordance with present invention.
Figure 5:
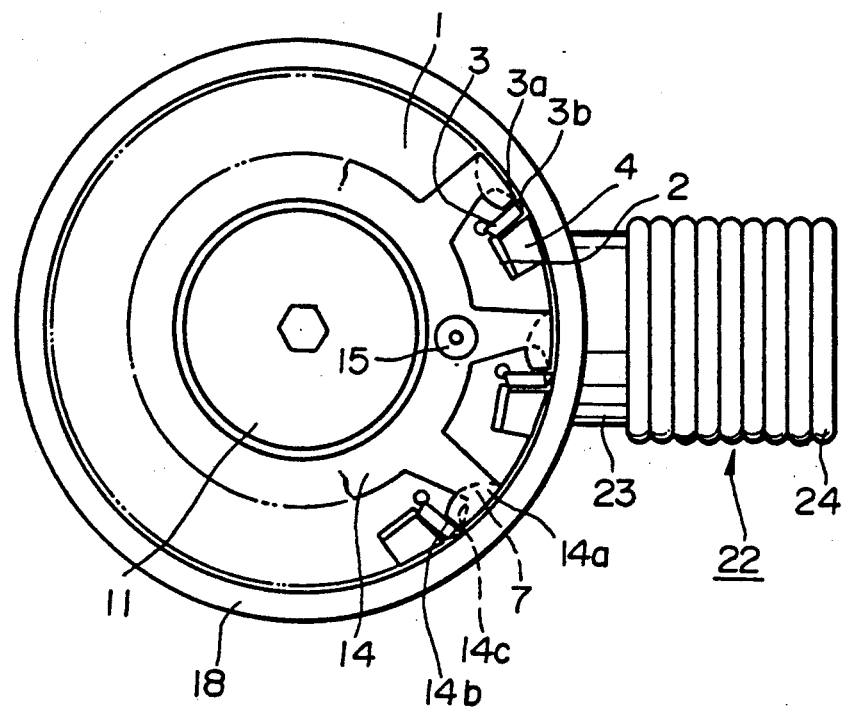
FIG 5 is an end view of the milling cutter of FIG. 4.
Figure 6:
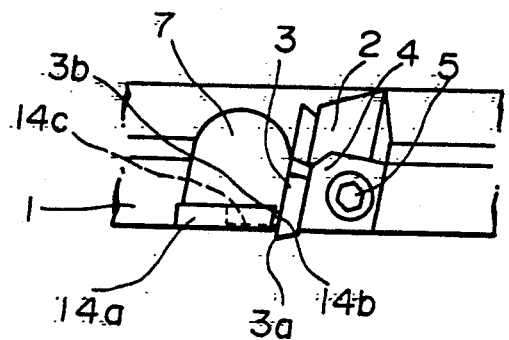
FIG. 6 is a side elevation of a part of the milling cutter of FIG 4.

FIGS. 4 to 6 depict a face milling cutter in accordance with the present invention, which comprises a cutter body 1 of a circular cross-section having an axis of rotation therethrough and having a forward end portion 1a and a reduced-diameter portion 1b extending rearwardly from the forward end portion 1a. The reduced-diameter portion 1b has a length greater than that of a conventional face milling cutter. The forward end portion 1a has an outer circumferential surface and a forward end face. A plurality of insert receiving recesses 2, each opening radially outwardly and forwardly with respect to the cutter body 1, are formed in the forward end portion 1a of the cutter body 1 in circumferentially equally spaced relation to each other. A plurality of chip pockets 7 are formed in the forward end portion 1a in circumferentially equally spaced relation to each other in such a manner as to be disposed adjacent to the insert receiving recesses 2, respectively, and displaced forwardly in a direction of rotation of the cutter body 1 relative to the cutter inserts 3, respectively. An indexable cutter insert 3 is received by and releasably secured to each of the recesses 2 by means of a wedge member 4 and a clamp screw 5. Each cutter insert 3 has an end cutting edge 3a indexed in an end cutting position and an outer peripheral cutting edge 3b indexed in an outer peripheral cutting position.

A shallow annular groove d is formed in the forward end face of the forward end portion 1a of the cutter body 1, and a guide member 14 for leading chips produced by the indexed cutting edges 3a and 3b of the inserts 3 into a chip disposal space, which will be described later, is received in the groove d and releasably secured thereto by a plurality of small countersunk head screws 15 in such a manner that its forward surface, which faces axially forwardly of the cutter body 1, is shifted slightly rearward of the cutter body 1 relative to the end cutting edges 3a of the inserts 3.

Figure 7:
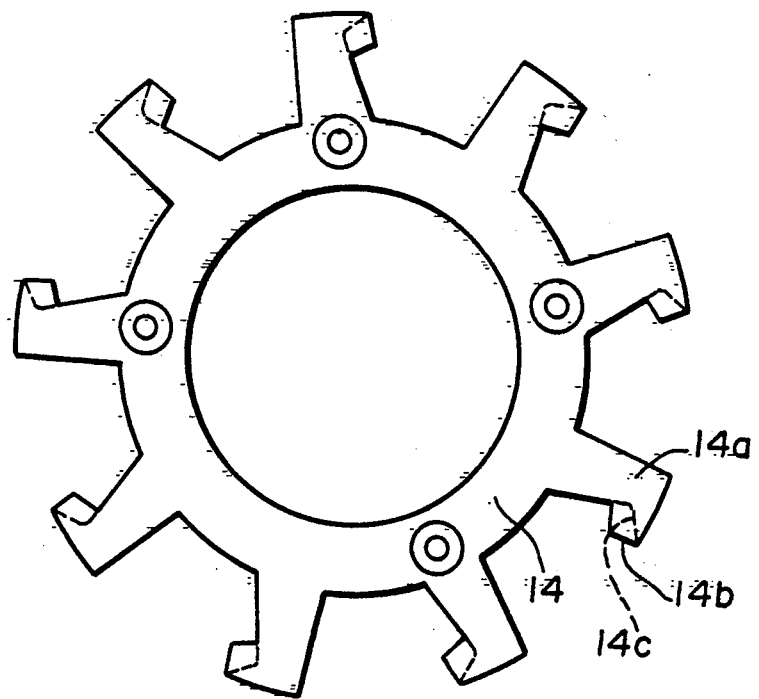
FIG. 7 is an end view of a guide member employed in the milling cutter of FIG. 4.

As best shown in FIG. 7, the guide member 14 comprises an annular plate having guide portions 14a of the same number as the inserts 3 and formed thereon in circumferentially equally spaced relation to each other. The guide portions are in the form of hook shaped pieces, and extend radially outwardly of the cutter body 1. As shown in FIGS. 4 and 5, the guide member 14 is dimensioned to have an outer diameter slightly smaller than that of the common locus of the outer peripheral cutting edges 3b of the inserts 3, so that when secured to the forward end portion 1a of the cutter body 1, the outer faces of the hook shaped pieces 14a are shifted slightly radially inward of the cutter body 1 relative to the outer peripheral cutting edges 3b of the inserts 3. As shown in FIGS. 5 and 6, each of the hook shaped pieces 1a is placed in position with the forward surface being generally flush with the forward end face of the forward end portion 1a of the cutter body 1 and with its end surface 14b, which faces toward a respective cutter insert 3, being spaced from the indexed end cutting edge 3a of the respective insert 3 by a prescribed distance. Thus, each hook shaped portion 14a covers a respective chip pocket 7 from the forward side of the cutter body to thereby close the chip disposal space, and to define a slight gap between its end surface 14c and the rake surface of the insert 3, whereby the chips removed from the surface of the workpiece are smoothly guided into a respective chip pocket 7. Furthermore, as shown in FIGS. 6 and 7, each hook shaped piece 14a has a recess 14c formed in its rearward surface facing axially rearward of the cutter body 1, the recess opening to the end surface 14c of the hook shaped portion 14a and in a direction radially inward of the guide member 14. With the provision of this recess 14c, the inside of the gap between the rake surface of the insert 3 and the end surface 14b of the hook shaped piece 14a is enlarged so that the chips are prevented from jamming when passing through the gap.

Moreover, as is the case with a prior art cutter, a shaft portion 8a of an arbor 8 is fit into a mounting bore 10 of the cutter body 1, and a fastening bolt 11 is screwed from the forward side of the body into the end face of the shaft portion 8a, so that the cutter body 1 is securely fixed to the arbor 8 with a key 9 interposed therebetween, so that the body can rotate coaxially with the arbor 8. The arbor 8 has a tapered shank 8b formed at a side opposite to the shaft portion 8a, and is fixedly secured to a spindle 12 by a drawing bolt (not shown) with the shank 8b being fitted into a tapered bore 12a of the spindle 12.

Furthermore, the arbor 8 has a large-diameter portion 8c formed at a rearward side of the shaft portion 8a, and a bearing 17 is fitted on and securely fixed to the large-diameter portion 8a by means of a stop ring 16. A chip-holding covering 18, which is joined to an annular cover plate 19 through screws 20, is fitted on the outer ring of the bearing 17 so that the arbor 8 can be rotated relative to and coaxially with the covering 18.

As shown in FIGS. 4 and 5, the covering 18 comprises a hollow cylindrical body with a thin wall which surrounds the cutter body 1 and the outer peripheral cutting edges 3b of the inserts 3, and has such an inner diameter such that a chip disposal space 21 of a sufficient volume for holding the chips broken by the chip pockets 7 is defined between an inner peripheral surface of the covering and the outer peripheral surface of the reduced-diameter portion of the cutter body 1. Furthermore, the diameter of the inner periphery of the covering 18 at a position adjacent to the bearing 17 is reduced so as to be slightly greater than that of the reduced-diameter portion of the cutter body 1. With this construction, the chip disposal space 21 is substantially closed, and dust is prevented from entering the bearing 17. In addition, the forward end face of the covering 18 is placed in a position spaced slightly axially of the cutter body 1 relative to those portions of the outer peripheral cutting edges 3b of the inserts 3 which are used to cut the workpiece, and the inner peripheral surface of the forward end portion of the covering is made slightly larger in diameter than the loci of the outer peripheral cutting edges 3b of the inserts 3.

Moreover, a suction mechanism 22 for removing the chips in the chip disposal space 21 outwardly is connected to the outer peripheral surface of the chip-holding covering 18. More specifically, a through hole 18a is formed through the peripheral wall of the covering 18, and a connecting pipe 23 is fitted in and securely secured to the hole 18a. A duct hose 24 is fitted at its one end into the connecting pipe 23, and is connected at its other end to a suction machine (not shown), whereby the chips in the chip disposal space 21 can be suctioned and removed.

When carrying out a surface cutting using the aforesaid face milling cutter, the milling cutter is securely fixed to the spindle 12 by fitting the tapered shank 8b of the arbor 8 into the tapered bore 12a of the spindle 12, raising the arbor 8 axially of the spindle 12 by means of a drawing bolt, and securing the arbor 8 to the spindle 12 through the key 13.

Thereafter, the workpiece W is immovably placed on the table of the machine tool (not shown) so as to be perpendicular to the axis of the spindle 12. The spindle 12 is then rotated about its axis, and the spindle 12 or the table of the machine tool is caused to move axially of the spindle 12 to form a prescribed cutting in the surface of the workpiece W. Then, the spindle 12 or the table of the machine tool is caused to move in a direction perpendicular to the axis of the spindle 12 while operating the suction machine.

Thus, the chips, removed from the surface of the workpiece W by the end cutting edges 3a, are led by the end faces of the hook shaped pieces 14a of the guide member 14 through the gap between the rake surfaces of the inserts 3 and the end faces of the hook shaped pieces 14a of the guide member 14 into the chip pockets 7 and are broken. Since chips are successively removed into the chip pockets 7, the broken chips are pressed upward into the chip disposal space 21, and are led through the connecting pipe 22 and the duct hose 23 and are removed.

As described above, during the cutting operation using the face milling cutter in accordance with the present embodiment, the chips produced by the cutting edges 3a and 3b are led by the guide member 14 into the chip pockets 7 and further into the chip disposal space 21. Then, they are removed away from the chip disposal space 21 by the operation of the suction mechanism 22 connected to the covering 18. Thus, the chips are prevented from being piled on the surface of the workpiece W and from scattering on and around the machine tool. Accordingly, the cutting edges are less susceptible to chipping during cutting, and deterioration of the worked surface can also be prevented. In addition, the lowering of the cutting precision due to the thermal deformation of the workpiece W or the machine tool as well as the lowering of the service life of the machine tool can be prevented.

In the foregoing, an insert face milling cutter is illustrated as a rotary cutting tool of the invention, but the invention is applicable to other types of rotary cutting tools such as a brazed face milling cutter or a shell end mill. In addition, the position of the connecting pipe 23 on the covering 18 should preferably determined so that the chips are caused to scatter due to the centrifugal force of the cutter body 1. Furthermore, a plurality of connecting pipes may be provided in order to increase the chip disposal ability.

What is claimed is:

1. A rotary cutting tool comprising:
    (a) a cutter body including an axis of rotation therethrough and including a forward end portion having an outer circumferential surface and a forward end face, said cutter body including chip pocket means for collecting cutting chips;
    (b) cutting means provided on said cutter body and having at least one end cutting edge disposed in an end cutting position and at least one outer peripheral cutting edge disposed in an outer peripheral cutting position, said cutting means being disposed adjacent said chip pocket means so as to be displaced therefrom circumferentially in a direction of rotation of the cutter body;
    (c) a covering of a generally cylindrical shape disposed rotatably relative to said cutter body so as to surround said outer circumferential surface of said forward end portion of said cutter body to define a chip disposal space therebetween;
    (d) a guide member attached to said forward end portion of said cutter body for leading chips produced during a cutting operation to said chip disposal space; and
    (e) suction means connected to said covering for removing the chips in said chip disposal space outwardly, said guide member being formed so as to cover said chip pocket means and being disposed adjacent to said cutting means so as to define gaps between said edges of said cutting means and said guide member, whereby chips produced during the cutting operation are led through said gaps into said chip disposal space by an airflow drawn into said suction means.

2. A rotary cutting tool according to claim 1, in which said cutting means comprises a plurality of indexable cutter inserts releasably secured to said forward end portion of said cutter body in circumferentially spaced relation to each other, said chip pocket means including a plurality of chip pockets formed in said forward end portion of said cutter body so as to correspond to said cutter inserts, respectively, each of said cutter inserts having said end cutting edge and said outer peripheral cutting edge, each of said chip pockets being disposed adjacent to a respective cutter insert and displaced forward in a direction of rotation of said cutter body relative to said respective cutter insert.

3. A rotary cutting tool according to claim 2, in which said guide member comprises an annular portion and a plurality of guide portions formed thereon in circumferentially spaced relation to each other, and is releasably secured to said forward end face of said forward end portion of said cutter body in such a manner that each of said guide portions substantially covers a respective chip pocket from a forward side of the cutter body.

4. A rotary cutting tool according to claim 3, in which each of said guide portions has a forward surface facing axially forward of said cutter body, a rearward surface facing axially rearward of said cutter body and an end surface facing toward a respective cutter insert, and is placed in position with said forward surface being generally flush with said forward end face of said forward end portion of said cutter body and with said end surface being spaced from said end cutting edge of said cutter insert by a prescribed distance.

5. A rotary cutting tool according to claim 4, in which end of said guide portions of said guide member has a recess formed in said rearward surface and opening to said end surface.

* * * * *